(12) United States Patent
Pudleiner et al.

(10) Patent No.: US 11,198,769 B2
(45) Date of Patent: Dec. 14, 2021

(54) PLASTIC FILMS FOR ID DOCUMENTS HAVING IMPROVED PROPERTIES FOR LASER ENGRAVING AND IMPROVED CHEMICAL RESISTANCE

(71) Applicant: Covestro Deutschland AG, Leverkusen (DE)

(72) Inventors: Heinz Pudleiner, Krefeld (DE); Georgios Tziovaras, Neuss (DE); Kira Planken, Goch (DE); Stefan Janke, Brüggen (DE); Christoph Köhler, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 68 days.

(21) Appl. No.: 16/472,350

(22) PCT Filed: Dec. 18, 2017

(86) PCT No.: PCT/EP2017/083367
§ 371 (c)(1),
(2) Date: Jun. 21, 2019

(87) PCT Pub. No.: WO2018/114836
PCT Pub. Date: Jun. 28, 2018

(65) Prior Publication Data
US 2019/0358987 A1    Nov. 28, 2019

(30) Foreign Application Priority Data
Dec. 22, 2016    (EP) .................................... 16206115

(51) Int. Cl.
*C08J 5/10*    (2006.01)
*C08J 5/18*    (2006.01)
(Continued)

(52) U.S. Cl.
CPC ................ *C08J 5/18* (2013.01); *B32B 27/08* (2013.01); *B32B 27/365* (2013.01);
(Continued)

(58) Field of Classification Search
CPC ... B32B 27/08; B32B 27/365; B32B 2250/02; B32B 2250/03; B32B 2250/244; B32B 2250/40; B32B 2270/00
(Continued)

(56) References Cited

U.S. PATENT DOCUMENTS 3,692,744 A    9/1972    Rich et al.
4,035,958 A    7/1977    Nishio
(Continued)

FOREIGN PATENT DOCUMENTS

CN    1812882 A    8/2006
CN    102196920 A    9/2011
(Continued)

OTHER PUBLICATIONS

International Search Report for PCT/EP2017/083367 dated Mar. 6, 2018.
(Continued)

*Primary Examiner* — Betelhem Shewareged
(74) *Attorney, Agent, or Firm* — Faegre Drinker Biddle & Reath LLP

(57) ABSTRACT

The present invention relates to plastic films with improved laser engraving capability, chemical resistance and mechanical stress, special embodiments of such films in the form of co-extrusion films, layer structures comprising such films, use of such films, as well as security documents, preferably identification documents, containing such films.

15 Claims, 1 Drawing Sheet

Figure 1:
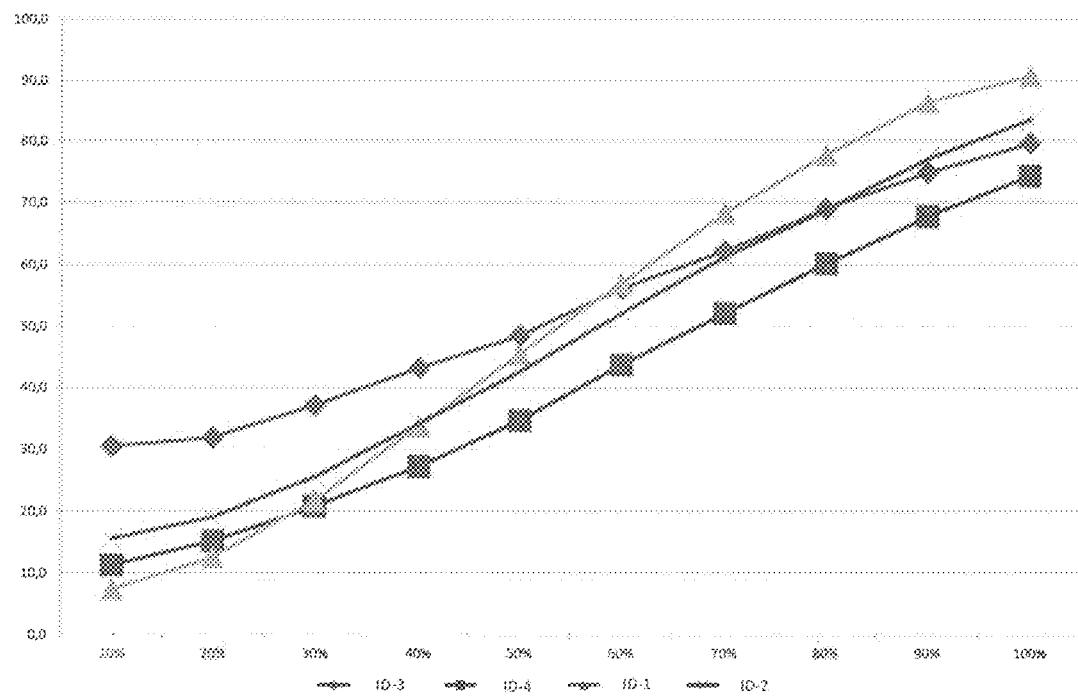

(51) Int. Cl.
*B32B 27/08* (2006.01)
*B32B 27/36* (2006.01)

(52) U.S. Cl.
CPC ....... *B32B 2250/02* (2013.01); *B32B 2250/03* (2013.01); *B32B 2250/244* (2013.01); *B32B 2250/40* (2013.01); *B32B 2270/00* (2013.01); *C08J 2369/00* (2013.01); *C08J 2467/02* (2013.01)

(58) Field of Classification Search
USPC ...................................................... 428/195.1
See application file for complete search history.

(56) References Cited

U.S. PATENT DOCUMENTS

| | | | |
|---|---|---|---|
| 4,176,224 | A | 11/1979 | Bier et al. |
| 4,515,925 | A | 5/1985 | Kleiner et al. |
| 4,647,630 | A | 3/1987 | Schmid et al. |
| 4,982,014 | A | 1/1991 | Freitag et al. |
| 5,126,428 | A | 6/1992 | Freitag et al. |
| 5,804,681 | A | 9/1998 | Breant |
| 5,932,687 | A | 8/1999 | Baumann et al. |
| 6,136,948 | A | 10/2000 | Dickens, Jr. et al. |
| 6,245,281 | B1 | 6/2001 | Scholten et al. |
| 7,771,646 | B2 | 8/2010 | Clauss et al. |
| 8,039,525 | B2 | 10/2011 | Loyen et al. |
| 8,287,950 | B2 | 10/2012 | Ouvrard et al. |
| 8,444,886 | B2 | 5/2013 | Herve |
| 9,079,443 | B2 | 7/2015 | Pudleiner et al. |
| 9,375,968 | B2 | 6/2016 | Pudleiner et al. |
| 9,446,619 | B2 | 9/2016 | Pudleiner et al. |
| 10,131,178 | B2 | 11/2018 | Pudleiner et al. |
| 2011/0193337 | A1 | 8/2011 | Tziovaras et al. |
| 2013/0307196 | A1 | 11/2013 | Corriol et al. |
| 2014/0065431 | A1* | 3/2014 | Sakellarides ........... B32B 27/36 428/446 |
| 2014/0127515 | A1* | 5/2014 | Sakellarides ........... B32B 27/08 428/413 |
| 2014/0349038 | A1* | 11/2014 | Pudleiner ............... B42D 25/00 428/32.39 |
| 2019/0358987 | A1* | 11/2019 | Pudleiner ................... C08J 5/18 |

FOREIGN PATENT DOCUMENTS

| | | |
|---|---|---|
| CN | 102307726 A | 1/2012 |
| CN | 104144794 A | 11/2014 |
| CN | 104395379 A | 3/2015 |
| DE | 1900270 A1 | 11/1969 |
| DE | 2407674 A1 | 10/1974 |
| DE | 1966931 A1 | 5/1975 |
| DE | 2407776 A1 | 9/1975 |
| DE | 2715932 A1 | 10/1978 |
| DE | 3832396 A1 | 2/1990 |
| EP | 0106225 A1 | 4/1984 |
| EP | 359953 A1 | 3/1990 |
| EP | 1637318 A1 | 3/2006 |
| EP | 2130674 A1 | 12/2009 |
| FR | 1561518 A | 3/1969 |
| GB | 1229482 A | 4/1971 |
| NL | 7802830 A | 9/1979 |
| WO | WO-200450767 A1 | 6/2004 |
| WO | WO-2004050766 A1 | 6/2004 |
| WO | WO-2005110773 A1 | 11/2005 |
| WO | WO-2006042714 A1 | 4/2006 |
| WO | WO-2010034407 A1 | 4/2010 |
| WO | WO-2010046042 A1 | 4/2010 |
| WO | WO-2010089035 A1 | 8/2010 |
| WO | WO-2013107773 A1 | 7/2013 |
| WO | WO-2013107777 A1 | 7/2013 |

OTHER PUBLICATIONS

Written Opinion of the International Searching Authority for PCT/EP2017/083367 dated Mar. 6, 2018.

* cited by examiner

COV 16 1 171-FC

Nullwert Karte = zero value card

Diagrammbereich = Diagram zone

PLASTIC FILMS FOR ID DOCUMENTS HAVING IMPROVED PROPERTIES FOR LASER ENGRAVING AND IMPROVED CHEMICAL RESISTANCE

CROSS-REFERENCE TO RELATED APPLICATIONS

This application is a national stage application (under 35 U.S.C. § 371) of PCT/EP2017/083367, filed Dec. 18, 2017, which claims benefit of European Application No. 16206115.4, filed Dec. 22, 2016, both of which are incorporated herein by reference in their entirety.

The present invention relates to plastic films with improved laser engraving capability, chemical resistance and mechanical stress, special embodiments of such films in the form of co-extrusion films, layer structures comprising such films, use of such films, as well as security documents, preferably identification documents containing such films.

Writing on plastic films by means of laser engraving is an important step in the production of laminates. Such laminates for example play a large role for security documents, in particular identification documents such as passports, identification documents, ID cards or credit cards. The black and white personalisation of cards by means of laser engraving, i.e. applying signatures or images such as black/white photos is well-known. Generally personalisation by means of laser engraving is characterized in particular by its high falsification security. The (print) image is created inside the card, so that removal of the (print) image and production of a new (print) image are not possible. Separation of the cards into their individual layers, in order to reach the laser layer, is not possible for example with cards, which are completely made of polycarbonate. In addition individual layers of such composite cards are usually produced using offset printing for coloured design. With laser engraving there is a risk that in areas with intensive black colouring in particular, it can lead to damage or even burning of the offset printing layer. Thus the card becomes useless. Since laser engraving is carried out at the end of the card production process, unacceptable quality results in reduced card output. These laminates are usually personalised inside the composite film by means of laser engraving. Furthermore, cover films to protect against chemicals and outside effects merit recommendation in such security documents.

WO 2010/089035 A1 discloses layer structures with improved laser engraving capability, co-extrusion films with improved laser engraving capability as well as security documents, preferably identification documents containing such layer structures. The layer structures disclosed in WO 2010/089035 A1 are based on polycarbonate and comprise a laser-sensitive layer. These films have disadvantages regarding their ability to be laminated with commercial cover films, for example those made from PVC (polyvinyl chloride) or PETG (glycolised polyethylene terephthalate) and chemical resistance.

WO 2005/110773 A discloses multi-layer portable data-carriers, which have a co-extruded multi-layer core film and a co-extruded multi-layer cover film. The cover film consists at least partially of a co-polyester and/or a crystalline, part-crystalline or micro-crystalline polyester and/or a polycarbonate. The laser etching of data-carriers disclosed in WO 2005/110773 A takes place in the core layer.

In the domain of security documents, in particular identification documents such as passports, ID cards, bank or credit cards there is a need for films, in particular cover films, which have a high chemical resistance and can be easily laminated to form composite layers and which at the same time have a good laser engraving capability for personalisation.

The object of the invention was therefore to provide a film, in particular a cover film which has a good laminating capacity apart from high chemical resistance to form composite layers. Furthermore the object consisted of providing a film, in particular a cover film, which additionally also has a high-contrast laser engraving capability, without disadvantageously impairing or damaging the underlying composite layer.

Surprisingly it was found that a film, comprising at least one layer (i) containing at least one blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s), characterized in that the portion of poly or co-polycarbonates(s) in this blend lies in a range from ≥50 wt.-% to ≤90 wt.-%, preferably in a range from ≥60 wt.-% to ≤80 wt.-%, particularly preferably in a range from ≥60 wt.-% to ≤70 wt.-%. and in that the poly or co-polycondensate(s) of an aromatic and/or a cycloalkyl dicarbonic acid and aliphatic, cycloaliphatic and/or araliphatic diols with 2 to 16 carbon atoms have a portion of 1,4-cyclohexane dimethanol, 1,3-cyclohexane dimethanol and/or 2,2,4,4-tetramethyl-1,3-cyclobutanediol in a range from ≥20 to ≤80 mol %, preferably in a range from ≥25 to ≤75 mol % and particularly preferable in a range from ≥25 to ≤70 mol %, related to the diol components, can be easily laminated to form a composite layer and has a high stability in relation to chemicals, in particular in relation to skin oil and acetone.

In the context of the invention ppm is understood to mean wt.-ppm, if not otherwise indicated.

In the context of the invention polycarbonate is understood to mean poly and/or co-polycarbonate.

In a further embodiment the at least one layer (i) of the inventive film comprises at least one laser-sensitive additive, preferably a black pigment, preferably carbon black. This embodiment of the invention can be easily personalised by means of laser engraving, without this laser engraving being impaired in regard to its sharpness, contrast and resolution.

The marking of plastic films by means of laser engraving in the professional world and also in the following is abbreviated to laser printing. Therefore in the following, the term "laser-printed" is understood to mean printed by laser engraving. The laser engraving process is well-known to the skilled person and should not be confused with printing by means of laser printers.

For example so-called laser marking additives are applicable as laser-sensitive additives, i.e. those made from an absorber in the wavelength range of the laser to be used, preferably in the wavelength range of ND:YAG lasers (neodymium-doped yttrium aluminium garnet lasers). Such laser marking additives and their use in moulding materials are described for example in WO-A 2004/50766 and WO-A 2004/50767 and are commercially available from the DSM company under the proprietary name Micabs®. Furthermore absorbers suitable as laser-sensitive additives are carbon black, as well as phosphoric tin-copper-mixed oxides as described for example in WO-A 2006/042714.

Laser-sensitive additives are preferred for dark marking by laser engraving on light substrates. Particularly preferred laser-sensitive additives in the context of the invention are black pigments. A very particularly preferred laser-sensitive additive is carbon black.

The laser-sensitive additive in the inventive film can be contained in a quantity from 40 to 180 ppm, preferably from 50 to 160 ppm.

It is preferable if the particle size of the laser-sensitive additive lies in the range of 100 Nm to 10 µm and particularly advantageous if it lies in the range of 50 Nm to 2 µm.

Then at least one layer (i) of the inventive film contains at least one blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s), characterized in that the portion of poly or co-polycarbonates(s) in this blend lies in a range from ≥50 wt.-% to ≤90 wt.-%, preferably in a range from ≥60 wt.-% to ≤80 wt.-%, very particularly preferable in a range from ≥60 wt.-% to ≤70 wt.-% and in that the poly or co-polycondensate(s) of an aromatic and/or a cycloalkyl dicarbonic acid and aliphatic, cycloaliphatic and/or araliphatic diols with 2 to 16 carbon atoms have a portion of 1,4-cyclohexane dimethanol, 1,3-cyclohexane dimethanol and/or 2,2,4,4-tetramethyl-1,3-cyclobutanediol, preferably 1,4-cyclohexane dimethanol and/or 1,3-cyclohexane dimethanol in a range from ≥20 to ≤80 mol %, preferably in a range from ≥25 to ≤75 mol % and particularly preferable in a range from ≥25 to ≤70 mol %, related to the diol components.

The components of the blends are described in detail below.

The poly or co-polycondensates of an aromatic and/or a cycloalkyl dicarbonic acid and aliphatic, cycloaliphatic and/or araliphatic diols with 2 to 16 carbon atoms can be produced according to well-known methods from the corresponding dicarbonic acid (or its reactive derivatives) and aliphatic, cycloaliphatic and/or araliphatic diols with 2 to 16 C-atoms (Plastics Manual vol. VIII, page 695 if, Karl Hanser-Verlag, Munich 1973).

At least one compound from the group: orthophthalic acid, teraphthalic acid, isophthalic acid, tert butylisophthalic acid, 3,3'-diphenyl dicarbonic acid, 4,4'-diphenyl dicarbonic acid, 4,4-benzophenone dicarbonic acid, 3,4'-benzophenone dicarbonic acid, 4,4'-diphenyl ether dicarbonic acid, 4,4'-diphenyl sulfone dicarbonic acid, 2,2-bis (4-carboxyphenyl)-propane, trimethyl-3-phenyl lindane-4,5'-dicarbonic acid, napthalene-1,4-dicarbonic acid, napthalene-1,5-dicarbonic acid, napthalene-2,6-dicarbonic acid and/or cyclohexane dicarbonic acid or the reactive derivatives of the dicarbonic acids, preferably the teraphthalic acid mentioned, napthalene-1,4-dicarbonic acid, napthalene-1,5-dicarbonic acid, napthalene-2,6-dicarbonic acid and/or isophthalic acid or the reactive derivatives of the dicarbonic acids mentioned, particularly preferable teraphthalic acid and/or isophthalic acid or their reactive derivatives and very particularly preferable teraphthalic acid or a reactive derivative of the teraphthalic acid can be used as dicarbonic acid of the poly or co-polycondensate.

The acid component of the poly or polycondensate can also contain, beside the dicarbonic acids specified above, up to 20 mol % of other aromatic dicarbonic acids with 8 to 14 C-atoms or aliphatic dicarbonic acids with 4 to 12 C-atoms, as for example phthalic acid, isophthalic acid, napthalene-2,6-dicarbonic acid, 4,4'-diphenyl dicarbonic acid, amber, Adipine, sebacic acid, malonic acid, glutaric acid, dodecane dicarbonic acid, cork acid, pimelic acid, azelaic acid, cyclohexane diacetic acid.

Aliphatic, cycloaliphatic or aliphatic diols with 2 to 16 C-atoms can be used as diol components of the poly or co-polycondensate, such as for example ethylene glycol, diethylene glycol, 1,2-propane diol, 1,3-propane diol, neopentyl glycol, 1,4-butanediol, 1,5-pentane diol, 1,6-hexane diol, p-xylene diol and mixtures from at least two of the above compounds, preferably ethylene glycol, diethylene glycol, 1,4-butanediol as well as mixtures from at least two of the above compounds.

The diol components can also contain up to 10 mol % of other aliphatic diols with 3 to 12 C-atoms or cycloaliphatic diols with 6 to 21 C-atoms, as for example of 2-ethyl propane diol-1,3,3-methyl pentane diol-2,4,2-methyl pentane diol-2,4,2,2,4-trimethyl pentane diol-1,3 and 2-ethyl hexane diol-1,6,2,2-diethyl propane diol-1,3, hexane diol-2,5,1,4-di ([beta]-hydroxyethoxy)-benzene, 2,2-bis (4-hydroxycyclohexyl)-propane, 2,4-dihydroxy-1,1,3,3-tetramethyl-cyclobutane, 2,2-bis (3 [beta]-hydroxyethoxyphenyl)-propane and 2,2-bis (4-hydroxypropoxyphenyl)-propane (see DE-OS 24 07 674, 24 07 776, 27 15 932), 1,4:3,6-dianhydro-D-sorbitol (isosorbide), and 2,4,8,10-tetraoxaspiro [5.5]undecane-3,9-diethanol as well as mixtures from at least two of the above compounds.

Polyalkylene terephthalates are suitable as poly or co-polycondensates of a teraphthalic acid in preferred embodiments of the invention. Suitable polyalkylene terephthalates for example are reaction products of aromatic dicarbonic acids or their reactive derivatives (for example dimethyl esters or anhydrides) and aliphatic, cycloaliphatic or araliphatic diols and mixtures of these reaction products.

Preferred polyalkylene terephthalates can be produced from teraphthalic acid (or their reactive derivatives) and aliphatic, cycloaliphatic or araliphatic diols with 2 to 16 C-atoms according to well-known methods (Plastics Manual, vol. VIII, page 695 if, Karl Hanser-Verlag, Munich 1973).

Preferred polyalkylene terephthalates contain at least 80 mol %, preferably 90 mol % of teraphthalic acid residues, related to the dicarbonic acid component and ≥20 to ≤80 mol %, preferably ≥25 to ≤75 mol % and particularly preferable ≥25 to ≤70 mol % of 1,4-cyclohexane dimethanol, 1,3-cyclohexane dimethanol and/or 2,2,4,4-tetramethyl-1,3-cyclobutanediol, preferably 1,4-cyclohexane dimethanol and/or 1,3-cyclohexane dimethanol related to the diol components and ≥20 to ≤80 mol %, preferably ≥25 to ≤75 mol %, particularly preferably ≥30 to ≤75 mol % of ethylene glycol, diethylene glycol and/or 1,4-butanediol, related to the diol components.

The preferred polyalkylene terephthalate can be split by addition of relatively small quantities of 3- or 4 alcohols or 3- or 4-basic carbonic acids, as they are described for example in DE-OS 19 00 270 and U.S. Pat. No. 3,692,744. Examples of preferred splitting means are trimesic acid, trimellitic acid, trimethylolethane and—propane and pentaerythritol.

Preferably not more than 1 mol % of the splitting means, related to the acid or the alcohol component is used.

Polyalkylene terephthalates, which have been produced alone from teraphthalic acid and its reactive derivatives (for example its dialkyl esters) and 1,4-cyclohexane dimethanol, 1,3-cyclohexane dimethanol, ethylene glycol and/or butanediol-1,4, and mixtures of these polyalkalene teraphthalates are particularly preferred.

Preferred polyalkylene terephthalates are also co-polyesters, which are produced from at least two of the above-mentioned acid components and/or of at least two of the above-mentioned alcohol components, particularly preferred co-polyesters are poly (ethylene glycol/cyclohexane-dimethanol-1,4/butanediol-1,4)-terephthalates, poly (ethylene glycol cyclohexane-dimethanol-1,4/diethylene glycol)- terephthalates, poly (ethylene glycol/cyclohexane-dimethanol-1,4)-terephthalates and/or poly (butanediol-1,4)-terephthalates.

The polyalkalene teraphthalates preferably used as components preferably possess an intrinsic viscosity from approx. 0.4 to 1.5 dl/g, preferably 0.5 to 1.3 dl/g, in each case measured in phenol or dichlorobenzene (1:1 wt.-parts) at 25° C.

In preferred embodiments of the invention the blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s) concerns a blend from at least one or several poly or co-polycondensate(s) of a teraphthalic acid with poly or co-polycarbonate, provided that the portion of poly or co-polycarbonates(s) in this blend lies in a range from ≥50 wt.-% to ≤90 wt.-%, preferably in a range from ≥60 wt.-% to ≤80 wt.-% very particularly preferably in a range from ≥60 wt.-% to ≤70 wt.-% and in that the poly or co-polycondensate(s) of the teraphthalic acid have a portion of 1,4-cyclohexane dimethanol, 1,3-cyclohexane dimethanol and/or tetramethyl-1,3-cyclobutanediol, preferably 1,4-cyclohexane dimethanol and/or 1,3-cyclohexane dimethanol, in a range from ≥20 to ≤80 mol %, preferably in a range from ≥25 to ≤75 mol % and particularly preferably in a range from ≥25 to ≤70 mol %, related to the diol components.

In a further preferred embodiment of the invention, the blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s) concerns a blend from at least one or several poly or co-polycondensate(s) of a teraphthalic acid and an ethylene glycol, a diethylene glycol and/or a 1,4-butanediol with poly or co-polycarbonate, provided that the portion of poly or co-polycarbonates(s) in this blend lies in a range from ≥50 wt.-% to ≤90 wt.-%, preferably in a range from ≥60 wt.-% to ≤80 wt.-% very particularly preferable in a range from ≥60 wt.-% to ≤70 wt.-% and in that the poly or co-polycondensate(s) of the teraphthalic acid have a portion of 1,4-cyclohexane dimethanol, 1,3-cyclohexane dimethanol and/or tetramethyl-1,3-cyclobutanediol, preferably 1,4-cyclohexane dimethanol and/or 1,3-cyclohexane dimethanol in a range from ≥20 to ≤80 mol %, preferably in a range from ≥25 to ≤75 mol % and particularly preferably in a range from ≥25 to ≤70 mol %, related to the diol components.

In a particularly preferred embodiment of the invention the blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s) concerns a blend from poly or co-polybutylene teraphthalate and/or glycol-modified poly or co-poly cyclohexylene dimethylene teraphthalate, provided that the portion of poly or co-polycarbonates(s) in this blend lies in a range from ≥50 wt.-% to ≤90 wt.-%, preferably in a range from ≥60 wt.-% to ≤80 wt.-%, very particularly preferable in a range from ≥60 wt.-% to ≤70 wt.-% and in that the poly or co-polyterephthalate has a portion of 1,4-cyclohexane dimethanol, 1,3-cyclohexane dimethanol and/or tetramethyl-1,3-cyclobutanediol, preferably 1,4-cyclohexane dimethanol and/or 1,3-cyclohexane dimethanol in a range from ≥20 to ≤80 mol %, preferably in a range from ≥25 to ≤75 mol % and particularly preferable in a range from ≥25 to ≤70 mol %, related to the diol components.

In a further preferred embodiment of the invention the blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s) concerns a blend from poly or co-polybutylene teraphthalate and/or glycol-modified poly or co-poly cyclohexylene dimethylene teraphthalate with poly or co-polycarbonate one blends out ≥15 to ≤40 wt.-% glycol-modified poly or co-poly cyclohexylene dimethylene teraphthalate, 0 to ≤20 wt.-% poly or co-polybutylene teraphthalate with ≥60 wt.-% to ≤80 wt.-% poly or co-polycarbonate.

Particularly aromatic polycarbonates or co-polycarbonates are suitable as poly or co-polycarbonates in preferred embodiments.

Polycarbonates or co-polycarbonates in the well-known way can be linear or split.

These polycarbonates can be produced in the well-known way from diphenols, carbonic acid derivatives, possibly chain breaking agents and possibly splitters. Details of the production of polycarbonates have been given in many patent specifications for approximately 40 years. By way of example, reference is made here to "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second edition, 1988, pages 648-718 and finally to Dres. U. Grigo, K. Kirchner and P. R. MUller "Polycarbonate" in Becker/Braun, Plastics Manual, volume 3/1, Polycarbonates, Polyacetals, Polyesters, Cellulose Esters, Carl Hanser Verlag Munich, Vienna 1992, pages 117-299.

Suitable diphenols for example can be dihydroxyaryl compounds with the general formula (1),

HO—Z—OH  (I)

where Z is an aromatic residue with 6 to 34 C-atoms, which can contain one or several possibly substituted aromatic cores and aliphatic or cycloaliphatic residues and/or alkyl aryls or hetero atoms as bridge members.

Examples of suitable dihydroxyaryl compounds are: dihydroxy benzenes, dihydroxy diphenyls, bis-(hydroxyphenyl)-alkanes, bis-(hydroxyphenyl)-cycloalkanes, bis-(hydroxyphenyl)-aryls, bis-(hydroxyphenyl)-ether, bis-(hydroxyphenyl)-ketones, bis-(hydroxyphenyl)-sulfides, bis-(hydroxyphenyl)-sulfones, bis-(hydroxyphenyl)-sulfoxides, 1,1'-bis-(hydroxyphenyl)-diisopropyl benzenes, as well as their ring-alkylated and ring-halogenated compounds.

This and further suitable other dihydroxyaryl compounds are described for example in DE-A 3 832 396, FR-A 1 561 518, in H. Schnell, Chemistry and Physics of Polycarbonates, Interscience Publishers, New York 1964, pages 28 ff.; pages 102 ff. and in D. G. Legrand, J. T. Bendler, Handbook of Polycarbonate Science and Technology, Marcel Dekker New York 2000, page 72 ff.

Preferred dihydroxyaryl compounds are for example Resorcin, 4,4'-dihydroxydiphenyl, bis-(4-hydroxyphenyl)-methane, bis-(3,5-dimethyl-4-hydroxyphenyl)-methane, bis-(4-hydroxyphenyl)-diphenyl-methan, 1,1-bis (4-hydroxyphenyl)-1-phenyl-ethane, 1,1-bis (4-hydroxyphenyl)-1 (1-naphthyl)-ethane, 1,1-bis (4-hydroxyphenyl)-1-(2-naphthyl)-ethane, 2,2-bis (4-hydroxyphenyl)-propane, 2,2-bis (3-methyl-4-hydroxyphenyl)-propane, 2,2-bis (3,5-dimethyl-4-hydroxyphenyl)-propane, 2,2-bis (4-hydroxyphenyl)-1-phenyl-propane, 2,2-bis (4-hydroxyphenyl)-hexadecimal fluorine propane, 2,4-bis (4-hydroxyphenyl)-2-methyl-butane, 2,4-bis (3,5-dimethyl-4-hydroxyphenyl)-2-methyl butane, 1,1-bis (4-hydroxyphenyl)-cyclohexane, 1,1-bis (3,5-dimethyl-4-hydroxyphenyl)-cylohexane, 1,1-bis (4-hydroxyphenyl)-4-methyl-cylohexane, 1,3-bis [2 (4-hydroxyphenyl)-2-propyl]-benzene, 1,1'-bis (4-hydroxyphenyl)-3-diisopropyl-benzene, 1,1'-bis (4-hydroxyphenyl)-4-diisopropyl-benzene, 1,3-bis [2 (3,5-dimethyl-4-hydroxyphenyl)-2-propyl]-benzene, bis (4-hydroxyphenyl)-ether, bis (4-hydroxyphenyl)-sulfide, bis (4-hydroxyphenyl)-sulfone, bis (3,5-dimethyl-4-hydroxyphenyl)-sulfone and 2,2',3,3'-tetrahydro-3,3,3',3'-tetramethyl-1,1'-spirobi [1H-indene]-5,5'-diol or dihydroxydiphenyl cycloalkane of the formula (Ia)

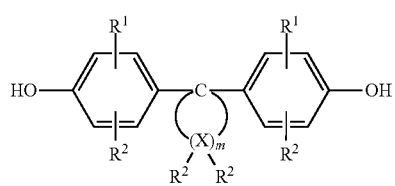
(Ia)

where $R^1$ and $R^2$ independent from one another mean hydrogen, halogen, preferably chlorine or bromine, $C_1$-$C_8$-alkyl, $C_5$-$C_6$ cycloalkyl, $C_6$-$C_{10}$-aryl, preferably phenyl, and $C_7$-$C_{12}$-aralkyl, preferably phenyl $C_1$-$C_4$-alkyl, in particular benzyl, m means a whole number from 4 to 7, preferably 4 or 5, $R^3$ and $R^4$ for each X individually selectable, independent from one another, mean hydrogen or $C_1$-$C_6$-alkyl and X means carbon, provided that, on at least one atom X, $R^3$ and $R^4$ simultaneously mean alkyl. Preferably $R^3$ and $R^4$ are simultaneously alkyl on one or two atom(s) X, in particular only on one atom X in the formula (Ia).

Preferred alkyl residue for the residues of $R^3$ and $R^4$ in formula (Ia) is methyl. The X-atoms in alpha-position to the diphenyl-substituted C-atom (C-1) are preferably not dialkyl-substituted, on the other hand the alkyl disubstitution in beta position to C-1 is preferred.

Particularly preferred dihydroxydiphenyl cycloalkanes of the formula (Ia) are those with 5 and 6 ring C atoms X in the cycloaliphatic residue (m=4 or 5 in the formula (Ia)), for example the diphenols of the formulae (Ia-1) to (Ia-3),

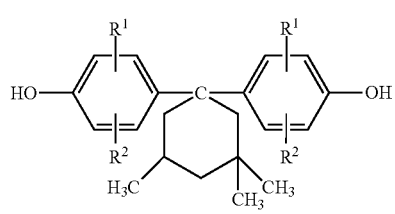
(Ia-1)

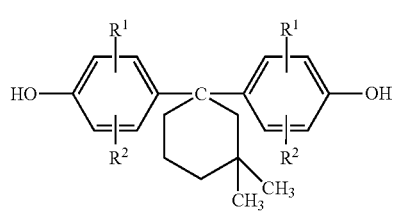
(Ia-2)

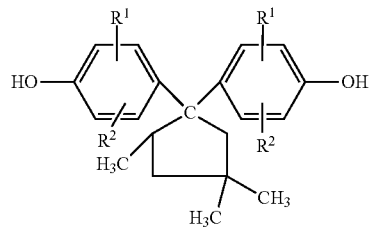
(Ia-3)

A particularly preferred dihydroxydiphenyl cycloalkane of the formula (Ia) is 1,1-bis (4-hydroxyphenyl)-3,3,5-trimethyl-cyclohexane (formula (Ia-1) with $R^1$ and $R^2$ equal to H).

Such polycarbonates can be produced in accordance with EP-A 359 953 from dihydroxydiphenyl cycloalkanes of the formula (Ia).

Particularly preferred dihydroxyaryl compounds is Resorcin, 4,4'-dihydroxydiphenyl, bis (4-hydroxyphenyl)-diphenyl-methane, 1,1-bis (4-hydroxyphenyl)-1-phenyl-ethane, bis (4-hydroxyphenyl)-1 (1-naphthyl)-ethane, bis (4-hydroxyphenyl)-(2-naphthyl)-ethane, 2,2-bis (4-hydroxyphenyl)-propane, 2,2-bis (3,5-dimethyl-4-hydroxyphenyl)-propane, 1,1-bis (4-hydroxyphenyl)-cyclohexane, 1,1-bis (3,5-dimethyl-4-hydroxyphenyl)-cyclohexane, 1,1-bis (4-hydroxyphenyl)-3,3,5-trimethyl-cyclohexane, 1,1'-bis (4-hydroxyphenyl)-3-diisopropyl-benzene and 1,1'-bis-(4-hydroxyphenyl)-4-diisopropyl-benzene.

Particularly preferred dihydroxyaryl compounds are 4,4'-dihydroxydiphenyl and 2,2-bis (4-hydroxyphenyl)-propane.

Both a dihydroxyaryl compound under formation of homopolycarbonates and different dihydroxyaryl compounds under formation of co-polycarbonates can be used. Both a dihydroxyaryl compound of the formula (I) or (Ia) under formation of homopolycarbonates and several dihydroxyaryl compounds of the formula (I) and/or (Ia) under formation of co-polycarbonates can be used. The different dihydroxyaryl compounds can be linked together both statistically and block-by-block. In the case of co-polycarbonates made from dihydroxyaryl compounds of the formulae (I) and (Ia), the molecular ratio of dihydroxyaryl compounds of the formula (Ia) to that of the other dihydroxyaryl compounds of the formula (I) possibly to be used is preferably between 99 mol % (Ia) to 1 mol % (I) and 2 mol % (Ia) to 98 mol % (I), preferably between 99 mol % (Ia) to 1 mol % (I) and 10 mol % (Ia) to 90 mol % (I) and in particular between 99 mol % (Ia) to 1 mol % (I) and 30 mol % (Ia) to 70 mol % (I).

A particularly preferred co-polycarbonate can be produced using 1,1-bis (4-hydroxyphenyl)-3,3,5-trimethyl-cyclohexane and 2,2-bis (4-hydroxyphenyl)-propane dihydroxyaryl compounds of the formulae (Ia) and (I).

Suitable carbonic acid derivatives for example can be diaryl carbonates of the general formula

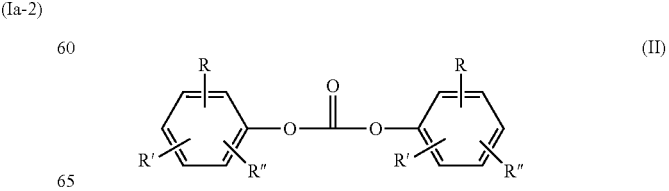
(II)

where

R, R' and R" independently directly or differently stand for hydrogen, linear or split $C_1$-$C_{34}$-alkyl, $C_7$-$C_{34}$-alkylaryl or $C_6$-$C_{34}$-aryl, R can also mean —COO—R'", whereby R'" stands for hydrogen, linear or split $C_1$-$C_{34}$-alkyl, $C_7$-$C_3$-alkylaryl or $C_6$-$C_{34}$-aryl.

Preferred diaryl carbonates are for example diphenyl carbonate, methylphenyl phenyl carbonates and di (methylphenyl)-carbonates, 4-ethylphenyl-phenyl-carbonate, di (4-ethylphenyl)-carbonate, 4-n-propylphenyl-phenyl-carbonate, di (4-n-propylphenyl)-carbonate, 4-iso-propylphenyl-phenyl-carbonate, di (4-iso-propylphenyl)-carbonate, 4-n-butylphenyl-phenyl-carbonate, di (4-n-butylphenyl)-carbonate, 4-iso-butylphenyl-phenyl-carbonate, di (4-iso-butylphenyl)-carbonate, 4-tert-butylphenyl-phenyl-carbonate, di (4-tert-butylphenyl)-carbonate, 4-n-pentylphenyl-phenyl-carbonate, di (4-n-pentylphenyl)-carbonate, 4-n-hexylphenyl-phenyl-carbonate, di (4-n-hexylphenyl)-carbonate, 4-iso-octylphenyl-phenyl-carbonate, di (4-iso-octylphenyl)-carbonate, 4-n-nonylphenyl-phenyl-carbonate, di (4-n-nonylphenyl)-carbonate, 4-cyclohexylphenyl-phenyl-carbonate, di (4-cyclohexylphenyl)-carbonate, 4 (1-methyl-1-phenylethyl)-phenyl phenyl carbonate, di [4 (1-methyl-1-phenylethyl)-phenyl]-carbonate, biphenyl-4-yl-phenyl-carbonate, di (biphenyl-4-yl)-carbonate, 4 (1-naphthyl)-phenyl phenyl carbonate, 4 (2-naphthyl)-phenyl phenyl carbonate, di [4 (1-naphthyl)-phenyl]-carbonate, di [4 (2-naphthyl)-phenyl]-carbonate, 4-phenoxyphenyl-phenyl-carbonate, di (4-phenoxyphenyl)-carbonate, 3-pentadecylphenyl-phenyl-carbonate, di (3-pentadecylphenyl)-carbonate, 4-tritylphenyl-phenyl-carbonate, di (4-tritylphenyl)-carbonate, methyl salicylate phenyl carbonate, di (methyl salicylate)-carbonate, ethyl salicylate phenyl carbonate, di (ethyl salicylate)-carbonate, n-propyl salicylate-phenyl-carbonate, di (n-propyl salicylate)-carbonate, iso propyl salicylate phenyl carbonate, di (iso propyl salicylate)-carbonate, n-butyl salicylate-phenyl-carbonate, di (n-butyl salicylate)-carbonate, iso butyl salicylate phenyl carbonate, di (iso butyl salicylate)-carbonate, tert butyl salicylate phenyl carbonate, di (tert butyl salicylate)-carbonate, di (phenylsalicylat)-carbonate and di (benzylsalicylat)-carbonate.

Particularly preferred diaryl compounds are diphenyl carbonate, 4-tert-butylphenyl-phenyl-carbonate, di (4-tert-butylphenyl)-carbonate, biphenyl-4-yl-phenyl-carbonate, di (biphenyl-4-yl)-carbonate, 4 (1-methyl-1-phenylethyl)-phenyl phenyl carbonate, di [4 (1-methyl-1-phenylethyl)-phenyl]-carbonate and di (methyl salicylate)-carbonate.

Diphenyl carbonate is particularly preferred.

Both a diaryl carbonate and different diaryl carbonates can be used.

To control and/or change the final groups additionally for example one or several monohydroxyaryl compound(s) can be used as chain breaking agents, which were not used to produce the diarylcarbonate(s) employed. It can concern those of the general formula (III),

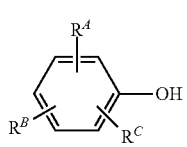
(III)

where $R^A$ stands for linear or split $C_1$-$C_{34}$-alkyl, $C_7$-$C_{34}$-alkylaryl, $C_6$-$C_{34}$-aryl or for —COO—$R^D$, whereby $R^D$ stands for hydrogen, linear or split $C_1$-$C_{34}$-alkyl, $C_7$-$C_{34}$-alkylaryl or $C_6$-$C_{34}$-aryl, and $R^B$, $R^C$, independently directly or differently, stand for hydrogen, linear or split $C_1$-$C_3$-alkyl, $C_7$-$C_{34}$-alkylaryl or $C_6$-$C_{34}$-aryl.

Such monohydroxyaryl compounds are for example 1, 2- or 3-methyl phenol, 2,4-dimethylphenol 4-ethyl phenol, 4-n-propylphenol, 4-iso-propylphenol, 4-n-butylphenol, 4-isobutylphenol, 4-tert-butylphenol, 4-n-pentylphenol, 4-n-hexylphenol, 4-iso-octylphenol, 4-n-nonylphenol, 3-pentadecylphenol, 4-cyclohexyl phenol, 4 (1-methyl-1-phenyl-ethyl)-phenol, 4-Phenylphenol, 4-phenoxyphenol, 4 (1-naphthyl)-phenol, 4 (2-naphthyl)-phenol, 4-tritylphenol, methyl salicylate, ethyl salicylate, n-propyl salicylate, iso propyl salicylate, n-butyl salicylate, iso butyl salicylate, tert butyl salicylate, phenyl salicylate and benzyl salicylate.

4-tert-butylphenol, 4-iso-octylphenol and 3-pentadecylphenol are preferred.

Suitable splitters are compounds with three and more functional groups, preferably such with three or more hydroxyl groups.

Suitable compounds with three or more phenolic hydroxyl groups are for example Phloroglucin, 4,6-dimethyl-2,4,6-tri (4-hydroxyphenyl)-heptene-2,4,6-dimethyl-2,4,6-tri (4-hydroxyphenyl)-heptane, 1,3,5-tri (4-hydroxyphenyl)-benzene, 1,1,1-tri (4-hydroxyphenyl)-ethane, tri (4-hydroxyphenyl)-phenyl methane, 2,2-bis (4,4-bis (4-hydroxyphenyl)-cyclohexyl]-propane, 2,4-bis (4-hydroxyphenyl-iso propyl)-phenol and tetra (4-hydroxyphenyl)-methane.

Other suitable compounds with three and more functional groups are for example 2,4-dihydroxybenzoic acid, trimesic acid (tri chloride), cyanuric acid trichloride and 3,3-bis (3-methyl-4-hydroxyphenyl) 2-oxo-2,3-dihydroindole.

Preferred splitters are 3,3-bis (3-methyl-4-hydroxyphenyl)-2-oxo-2,3-dihydroindole and 1,1,1-tri (4-hydroxyphenyl)-ethane.

In a preferred embodiment of the invention the film layer comprises a further layer (ii) whereby this further layer (ii) comprises one or several poly or co-polycondensate(s) of an aromatic and/or a cycloalkyl dicarbonic acid and aliphatic, cycloaliphatic and/or araliphatic diols with 2 to 16 carbon atoms.

The poly or co-polycondensates of an aromatic and/or a cycloalkyl dicarbonic acid and aliphatic, cycloaliphatic and/or araliphatic diols with 2 to 16 carbon atoms can be produced according to well-known methods from the corresponding dicarbonic acid (or its reactive derivatives) and aliphatic, cycloaliphatic and/or araliphatic diols with 2 to 16 C-atoms (Plastics Manual vol. VIII, page 695 if, Karl Hanser Verlag, Munich 1973).

At least one compound from the group: orthophthalic acid, teraphthalic acid, isophathalic acid, tert butylisophthalic acid, 3,3'-diphenyl dicarbonic acid, 4,4'-diphenyl dicarbonic acid, 4,4-benzophenone dicarbonic acid, 3,4'-benzophenone dicarbonic acid, 4,4'-diphenyl ether dicarbonic acid, 4,4'-diphenyl sulfone dicarbonic acid, 2,2-bis (4-carboxyphenyl)-propane, trimethyl-3-phenyl lindan-4,5'-dicarbonic acid, napthalene-1,4-dicarbonic acid, napthalene-1,5-dicarbonic acid, napthalene-2,6-dicarbonic acid and/or cyclohexane dicarbonic acid or the reactive derivatives of the dicarbonic acids, preferably the teraphthalic acid mentioned, napthalene-1,4-dicarbonic acid, napthalene-1,5-dicarbonic acid, napthalene-2,6-dicarbonic acid and/or isophthalic acid or the reactive derivatives of the dicarbonic acids mentioned, particularly preferable teraphthalic acid and/or isophthalic acid or their reactive derivatives and particularly preferable teraphthalic acid or a reactive derivative of the teraphthalic acid can be used as dicarbonic acid of the poly or co-polycondensate.

The acid component of the poly or co-polycondensates beside the dicarbonic acids specified above can also contain up to 20 mol % of other aromatic dicarbonic acids with 8 to 14 C-atoms or aliphatic dicarbonic acids with 4 to 12 C-atoms, as for example of phthalic acid, isophthalic acid, napthalene-2,6-dicarbonic acid, 4,4'-diphenyl dicarbonic acid, amber, Adipine, sebacic acid, malonic acid, glutaric acid, dodecane dicarbonic acid, cork acid, pimelic acid, azelaic acid, cyclohexane diacetic acid.

Aliphatic, cycloaliphatic or aliphatic diols with 2 to 16 C-atoms can be used as diol components of the poly or co-polycondensates, such as for example ethylene glycol, diethylene glycol, 1,2-propane diol, 1,3-propane diol, neopentyl glycol, 1,4-butanediol, 1,5-pentane diol, 1,6-hexane diol, p-xylene diol and mixtures from at least two of the above compounds, preferably ethylene glycol, diethylene glycol, 1,4-butanediol as well as mixtures from at least two of the above compounds.

The diol components can also contain up to 10 mol % of other aliphatic diols with 3 to 12 C-atoms or cycloaliphatic diols with 6 to 21 C-atoms, as for example of 2-ethyl propane diol-1,3,3-methyl pentane diol-2,4,2-methyl pentane diol-2,4,2,2,4-trimethylpentane diol-1,3 and 2-ethyl hexane diol-1,6,2,2-diethyl propane diol-1,3, hexane diol-2, 5,1,4-di ([beta]-hydroxyethoxy)-benzene, 2,2-bis (4-hydroxycyclohexyl)-propane, 2,4-dihydroxy-1,1,3,3-tetramethyl-cyclobutane, 2,2-bis (3 [beta]-hydroxyethoxyphenyl)-propane and 2,2-bis (4-hydroxypropoxyphenyl)-propane (see DE-OS 24 07 674, 24 07 776, 27 15 932), 1,4:3,6-dianhydro-D-sorbitol (isosorbide), and 2,4,8,10-tetraoxaspiro [5.5] undecane-3,9-diethanol as well as mixtures from at least two of the above compounds.

For example poly or co-polyethylene teraphthalate (PET or coPET), glycol modified PET (PETG), glycol modified poly or co-poly cyclohexylene dimethylene teraphthalate (PCTG) or poly or co-polybutylene teraphthalate (PBT or coPBT), polyethylene glycol naphthalate (PEN), polycyclohexane dimethanolcyclohexane dicarbonic acid (PCCD) and/or mixtures from at least two of the above compounds can be used as poly or co-polycondensates of an aromatic and/or a cycloalkyl dicarbonic acid and aliphatic, cycloaliphatic and/or araliphatic diols.

Very particularly preferably the further layer (ii) comprises one or several poly or co-polycondensate(s) of a teraphthalic acid, as by way of example and preferably poly or co-polyethylene teraphthalate (PET or coPET), glycol modified PET (PETG), glycol modified poly or co-polycyclohexylene dimethylene teraphthalate (PCTG) or poly or co-polybutylene teraphthalate (PBT or coPBT). In a preferred embodiment, the layer (ii) is free from poly and/or co-polycabonates.

In a preferred embodiment the further layer (ii) comprises a portion of 1,4-cyclohexane dimethanol, 1,3-cyclohexane dimethanol and/or 2,2,4,4-tetramethyl-1,3-butanediol, preferably 1,4-cyclohexane dimethanol and/or 1,3-cyclohexane dimethanol, in a range from ≥20 to ≤80 mol %, preferably in a range from ≥25 to ≤75 mol % and particularly preferably in a range of ≥25 to ≤70 mol %, related to the diol components of the one or several poly or co-polycondensate(s) of an aromatic and/or a cycloalkyl dicarbonic acid and aliphatic, cycloaliphatic and/or araliphatic diols with 2 to 16 carbon atoms.

In a further advantageous embodiment of the invention this further layer (ii) comprises one or several poly or co-polycondensate(s) of a teraphthalic acid, as by way of example and preferably poly or co-polyethylene teraphthalate (PET or coPET), glycol modified PET (PETG), glycol modified poly or co-polycyclohexylene dimethylene teraphthalate (PCTG) or poly or co-polybutylene teraphthalate (PBT or coPBT), whereby the poly or co-polycondensates of a teraphthalic acid have a portion of 1,4-cyclohexane dimethanol, 1,3-cyclohexane dimethanol and/or 2,2,4,4-tetramethyl-1,3-butanediol, preferably 1,4-cyclohexane dimethanol and/or 1,3-cyclohexane dimethanol, in a range from ≥20 to ≤80 mol %, preferably in a range from ≥25 to ≤75 mol % and particularly preferable, in a range from ≥25 to ≤70 mol %, related to the diol components.

In a further embodiment of the invention the film comprises the further layer (iii), whereby this third layer (iii) comprises one or several poly or co-polycondensate(s) of an aromatic and/or a cycloalkyl dicarbonic acid and aliphatic, cycloaliphatic and/or araliphatic diols with 2 to 16 carbon atoms and whereby the layers (i), (ii) and (iii) are arranged so that the two layers (ii) and (iii) form the outer layers of the film.

In a further preferred embodiment the further layer (ii) and/or the layer (iii) comprises a portion of 1,4-cyclohexane dimethanol, 1,3-cyclohexane dimethanol and/or 2,2,4,4-tetramethyl-1,3-butanediol, preferably 1,4-cyclohexane dimethanol and/or 1,3-cyclohexane dimethanol, in a range from ≥20 to ≤80 mol %, preferably in a range from ≥25 to ≤75 mol % and particularly preferable in a range from ≥25 to ≤70 mol %, related to the diol components of the one or several poly or co-polycondensate(s) of an aromatic and/or a cycloalkyl dicarbonic acid and aliphatic, cycloaliphatic and/or araliphatic diols with 2 to 16 carbon atoms.

For writing on the poly or co-polycondensates of an aromatic and/or a cycloalkyl dicarbonic acid and aliphatic, cycloaliphatic and/or araliphatic diols with 2 to 16 carbon atoms of the layer (iii) reference is made to the description of the poly or co-polycondensates of an aromatic and/or a cycloalkyl dicarbonic acid and aliphatic, cycloaliphatic and/or araliphatic diols with 2 to 16 carbon atoms for the layer (ii) in order to avoid unnecessary repetition.

In a preferred embodiment, the layer (ii) and/or the layer (iii) is free from poly and/or co-polycabonates, particularly preferred the layer (ii) and the layer (iii) is free from poly and/or co-polycabonates.

The two outer layers (ii) and (iii) in respect to the poly or co-polycondensates can be the same or different, preferably the poly or co-polycondensates of the two outer layers (ii) and (iii) are the same.

In a further embodiment of the invention the outer layers (ii) and (iii) are the same in regard to thickness and material.

The inventive film can have a total coating thickness in the range of ≥30 to ≤145 μm, preferably in the range of 40 to ≤120 ram, particularly preferably in the range of ≥40 to ≤110 μm.

In an embodiment of the invention, in which the film comprises at least one layer (i) and a further layer (ii), the layer (i) has a layer thickness in a range from ≥20 to ≤135 μm, preferably in the range of ≥30 to ≤110 μm, particularly preferably in the range of ≥30 to ≤100 μm.

In another embodiment of the invention, in which the film comprises at least one layer (i) and two outer layers (ii) and (iii), the layer (i) has a layer thickness in the range of ≥15 to ≤120 μm, preferably in the range of ≥20 to ≤100 μm, particularly preferably in the range of ≥20 to ≤90 μm.

At least one layer (i), (ii) and/or (iii) of the inventive film can also have at least one filler. The filler preferably concerns at least one colour pigment and/or at least one other filler to produce a translucence of the filled layers, particularly preferably a white pigment, very particularly preferably titanium dioxide, zirconium dioxide or barium sulfate, in a preferred embodiment titanium dioxide.

Filling at least one layer of the inventive film with at least such a filler improves the visibility of the engraved marking and/or image(s), as a result of which also perception of improved sharpness and resolution also increases further.

The fillers mentioned are preferably added in quantities from 2 to 45 wt.-%, particularly preferably from 5 to 30 wt.-%, related to the total weight of the layer, containing the filler, which can be done for example by extrusion or coextrusion.

In an embodiment of the invention the layer (i) and/or the layer (ii) comprises a filler.

In another embodiment of the invention the layer (i) comprises a filler and the layers (ii) and (iii) are free from fillers.

The inventive film comprising at least one layer (i) and a further layer (ii) and possibly a third layer (iii) can be produced by way of example and preferably by means of coextrusion of the contained layers, lamination of the contained layers or lamination by extrusion, i.e. extrusion of the layer(s) containing at least one layer (i) and a further layer (ii) and possibly a third layer (iii). The variants of coextrusion and extrusion are preferred. Production by means of coextrusion is very particularly preferred.

Such a film produced by means of coextrusion represents a particularly preferred embodiment of the inventive film and is likewise the subject matter of the invention.

Subject matter of the present invention is therefore a co-extrusion film comprising at least one layer (i) containing at least one blend from at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s), characterized in that the portion of poly or co-polycarbonates(s) in this blend lies in a range from ≥50 wt.-% to ≤90 wt.-%, preferably in a range from ≥60 wt.-% to ≤80 wt.-% very particularly preferably in a range from ≥60 wt.-% to ≤70 wt.-% and in that the poly or the co-polycondensate(s) of an aromatic and/or a cycloalkyl dicarbonic acid and aliphatic, cycloaliphatic and/or araliphatic diols with 2 to 16 carbon atoms have a portion of 1,4-cyclohexane dimethanol, 1,3-cyclohexane dimethanol and/or 2,2,4,4-tetramethyl-1,3-cyclobutanediol in a range from ≥20 to ≤80 mol %, preferably in a range from ≥25 to ≤75 mol % and particularly preferably in a range from ≥25 to ≤70 mol %, related to the diol components, of at least one or several poly or co-polycondensate(s) of an aromatic and/or a cycloalkyl dicarbonic acid and aliphatic, cycloaliphatic and/or araliphatic diols with 2 to 16 carbon atoms with one or several poly or co-polycarbonates(s), characterized in that the portion of poly or co-polycarbonates(s) in this blend lies in a range from ≥50 wt.-% and up to ≤90 wt.-%, preferably in a range from ≥60 wt.-% and to ≤80 wt.-% very particularly preferably in a range from ≥60 wt.-% to ≤70 wt.-% and in that the poly or the co-polycondensate(s) of an aromatic and/or a cycloalkyl dicarbonic acid and aliphatic, cycloaliphatic and/or araliphatic diols with 2 to 16 carbon atoms have a portion of 1,4-cyclohexane dimethanol, 1,3-cyclohexane dimethanol and/or 2,2,4,4-tetramethyl-1,3-cyclobutanediol in a range from 30 to 80 mol %, preferably in a range from 30 to 75 mol % and particularly preferably in a range from 32 to 68 mol % related to the diol components, and a further layer (ii), whereby this further layer contains one or several poly or co-polycondensate(s) of an aromatic and/or a cycloalkyl dicarbonic acid and aliphatic, cycloaliphatic and/or araliphatic diols with 2 to 16 carbon atoms.

In a further embodiment the co-extrusion inventive film contains a third layer (iii), whereby this third layer comprises one or several poly or co-polycondensate(s) of an aromatic and/or a cycloalkyl dicarbonic acid and aliphatic, cycloaliphatic and/or araliphatic diols with 2 to 16 carbon atoms and the layers are arranged so that the two layers (ii) and (iii) form the outer layers of the film.

A preferred embodiment is an at least triple layer co-extrusion film comprising at least the layers (i), (ii) and (iii), whereby the layers are arranged so that the layers (ii) and (iii) form the outer layers of the film.

In another preferred embodiment of the co-extrusion inventive film the layer (ii) and/or the layer (iii) is free from poly and/or co-polycarbonate.

The above statements regarding the inventive film, including the specified layer thicknesses, components and preferred areas are similarly valid for the co-extrusion inventive film.

The inventive film and consequently the co-extrusion inventive film are outstandingly suitable as a component for security documents, preferably identification documents and/or bank cards, which are to be marked by means of laser engraving. High sharpness and good quality of the elements applied by means of laser engraving are achieved when the inventive films are used. Personalisation of signatures and/or images can preferably be done by means of laser engraving. Very particularly preferably the layer structure according to the invention is suitable for identification documents in the shape of bonded or laminated composite layers in the form of plastic cards, as for example identity cards, passports, driving licenses, credit cards, bank cards, cards for access authorisation or other identification documents etc. Preferred identification documents in the context of the present invention are multi-layer laminar documents with security features such as chips, photographs, biometric data etc. These security features can be visible or at least interrogated from the outside. Preferably such an identification document has a size between that of a cheque card and that of a passport. Such an identification document can also be part of a document consisting of several parts, as for example an identification document made from plastic in a passport, which also contains paper or cardboard.

The inventive film and also the co-extrusion inventive film show good adhesion of the individual films in layer structures as for example in security documents at a low lamination temperature.

Furthermore the inventive films have very good chemical resistance in particular as a component in security documents, preferably identification documents and/or bank cards, in particular against acetone and artificial skin oil. The durability of security documents, in which the inventive film is contained, is better compared with conventional cards, which shows up in the alternate bend test.

Furthermore the subject matter of the invention is therefore a security document, preferably an identification document and/or a bank card containing at least one inventive film.

The inventive security document, preferably identification document, can comprise further additional layers, via which for example further information can be incorporated in the security document, preferably identification document and/or bank card.

Such further information for example can concern personal portraits or non-personal general information, which for example are contained in any generic security document, preferably identification document and/or bank card, in the same form.

Such layers can be incorporated into the security document, preferably identification document and/or bank card for example from films provided with this information beforehand by means of conventional printing processes, preferably ink-jet or laser printing, particularly preferably colour printing.

Films which cab printed on by means of ink-jet printing processes are commonly known to the skilled person and for example can be such inventive films. In particularly preferred embodiments white or translucent plastic films coloured by means of fillers as for example titanium dioxide, zirconium dioxide, barium sulfate etc. are used for better visibility of the printed information.

In particular such of the initially described inventive films, which have a specific surface resistance preferably from $10^7$ to $10^{13}\Omega$, from $10^8$ to $10^{12}\Omega$ are suitable for films to be printed on by means of laser engraving, in particular by means of colour laser engraving. The specific surface resistance in $\Omega$ is determined in accordance with DIN IEC 60093 (1993).

Preferably in this case it can concern such films, in which, to achieve the specific surface resistance, for example an additive selected from tertiary or quaternary, preferably quaternary ammonium or phosphonium salts of a part or perfluorinated organic acid or quaternary ammonium or phosphonium hexafluorophosphates, preferably a part or perfluorinated alkyl sulfonic acid, a perfluoroalkyl sulfonic acid was preferably added to the plastic before the film was produced. These additives can be contained in the layers (i), (ii) and/or (iii).

Preferred suitable quaternary ammonium or phosphonium salts are:
Perfluorooctanesulfonic acid tetrapropyl ammonium salt,
Perfluorobutanesulfonic acid tetrapropyl ammonium salt,
Perfluorooctanesulfonic acid tetrabutyl ammonium salt,
Perfluorobutanesulfonic acid tetrabutyl ammonium salt,
Perfluorooctanesulfonic acid tetrapentyl ammonium salt,
Perfluorobutanesulfonic acid tetrapentyl ammonium salt,
Perfluorooctanesulfonic acid tetrahexyl ammonium salt,
Perfluorobutanesulfonic acid tetrahexyl ammonium salt,
Perfluorobutanesulfonic acid trimethyl neopentyl ammonium salt,
Perfluorooctanesulfonic acid trimethyl neopentyl ammonium salt.
Perfluorobutanesulfonic acid dimethyl dineopentyl ammonium salt,
Perfluorooctanesulfonic acid dimethyl dineopentyl ammonium salt,
N-methyl-tripropyl ammonium perfluorobutyl sulfonate,
N-ethyl-tripropyl ammonium perfluorobutyl sulfonate,
Tetrapropyl ammonium perfluorobutyl sulfonate,
Diisopropyl dimethyl ammonium perfluorobutyl sulfonate,
Diisopropyl dimethyl ammonium perfluorooctyl sulfonate,
N-methyl-tributyl ammonium perfluorooctyl sulfonate
Cyclohexyl diethylmethyl ammonium perfluorooctyl sulfonate,
Cyclohexyl trimethyl ammonium perfluorooctyl sulfonate,
as well as the corresponding phosphonium salts. Ammonium salts are preferred.

Preferably one or several of the quaternary ammonium or phosphonium salts, i.e. mixtures can be also used.

Particularly suitable is perfluorooctanesulfonic acid tetrapropyl ammonium salt, perfluorooctanesulfonic acid tetrabutyl ammonium salt, perfluorooctanesulfonic acid tetrapentyl ammonium salt, perfluorooctanesulfonic acid tetrahexyl ammonium salt and perfluorooctanesulfonic acid dimethyl diisopropyl ammonium salt as well as the corresponding perfluorobutanesulfonic acid salts.

In a particularly preferred embodiment perfluorobutanesulfonic acid dimethyl diisopropyl ammonium salt (diisopropyl dimethyl ammonium perfluorobutyl sulfonate) can be used as additive.

The salts mentioned are known or can be produced according to well-known methods. The salts of the sulfonic acids can be represented for example by adding equimolar quantities of the free sulfonic acid with the hydroxy form of the corresponding cation in water at ambient temperature and concentrating the solution. Other manufacturing processes are described for example in DE-A 1 966 931 and NL-A 7 802 830.

The salts mentioned are preferably added to the thermoplastic plastics in quantities from 0.001 to 2 wt.-%, preferably from 0.1 to 1 wt.-% before shaping to the inventive film, which can be done for example by extrusion or coextrusion.

A further subject matter of the invention is a layer structure comprising at least one inventive film.

A further subject matter of the invention is a security document, preferably identification document and/or a bank card, containing at least one inventive film.

A further subject matter of the invention is the use of the inventive film as a surface layer in security documents, preferably identification documents and/or bank cards. In this embodiment of the invention the inventive security document, preferably identification document and/or bank card, ideally needs no further additional layers as e.g. for UV protection, protection from mechanical damage—as for example scratch-proof coatings.

The inventive security document, preferably identification document and/or bank card, can be produced for example so that piles from the various films for the structure of the security document, preferably identification document and/or bank card, are stacked up and laminated to form a composite layer and then cut up into the suitable form of the security document, preferably identification document and/or bank card. If necessary further layers can be applied later, for example by bonding and/or laminating further films or coating by means of lacquer compositions on this composite laminate.

The following examples serve the explanation by way of example of the invention and are not to be understood as restrictive.

EXAMPLES

Raw Materials Used:
Makrolon™ 3108 (M.3108): Very viscous amorphous, thermoplastic bisphenol A-polycarbonate with an MVR of 6 g/10 min according to ISO 1133 at 300° C. and 1.2 kg supplied by Covestro AG
Eastar™ DN 010 (DN 010): Poly or co-polycondensate of a teraphthalic acid from 54.9 wt.-% teraphthalic acid, 9.3 wt.-% (38 mol % related to the diol components) ethylene glycol and 35.8 wt.-% (62 mol % related to the diol components) cyclohexane dimethanol-1,4, with an inherent viscosity of 0.74 dl/g (measured in a 1:1 mixture from phenol and tetrachlorethane at 25° C.) supplied by the Eastman Chemical company.

Eastar™ GN 001 (GN 001): Poly or co-polycondensate of a teraphthalic acid from 60.2 wt.-% teraphthalic acid, 18.0 wt.-% (65 mol % related to the diol components) ethylene glycol, 1.5 wt.-% diethylene glycol (3 mol % related to the diol components) and 20.3 wt.-% (32 mol % related to the diol components) cyclohexane dimethanol-1,4, with an inherent viscosity of 0.74 dl/g (measured in a 1:1 mixture from phenol and tetrachlorethane at 25° C.) supplied by the Eastman Chemical company.

Pocan™ B 1600 (PBT 1600): Unmodified polycondensation product of the teraphthalic acid and butanediol-1,4 as diol components with a melt rate of 14 g/10 min according to ISO 1133 at 260° C. and 2.16 kg supplied by Lanxess AG.

Pentacard™ PVC M 278/01 (PVC laserable): Laser writable PVC film supplied by the Klöckner company Pentaplast in a thickness of 100 µm.

Pentacard™ PETG MG0ST00 (PETG laserable): Laser writable PETG film supplied by the Klöckner company Pentaplast in a thickness of 150 µm, polycondensation product of a teraphthalic acid from 60.6 wt.-% (100 mol % related to the diol components) teraphthalic acid, 18.8 wt.-% ethane diol and 20.6 wt.-% cyclohexane dimethanol-1,4 with an inherent viscosity of >/=0.78 dL/g.

Pentacard™ PETG (white core film) (PETG white): White opaque tinted PETG film supplied by the Klöckner company Pentaplast in a thickness of 300 µm for card cores.

Pentacard™ PVC (white core film) (PVC white): White opaque tinted PVC film supplied by the Klöckner company Pentaplast in a thickness of 280 µm for card cores.

Master Batch 1: Compounding of a Highly Concentrated Master Batch Containing a Laser-Sensitive Additive The production of the master batch was used for the production of the laserable layer(s), took place with a conventional twin-screw compounder extruder (ZSK 32) at processing temperatures usual for polycarbonate from 250 to 330° C.

A master batch with the following composition was compounded and then granulated:

99.9 wt.-% Makrolon™ 3108 polycarbonate 0.1 wt.-% (1000 ppm) lamp black 101 (carbon black supplied by the Degussa company) with average particle size of 95 nm.

Master Batch 2: Compounding of a Master Batch Containing a White Pigment as Filler The production of the master batch for the production of a white layer took place with a conventional twin-screw compounder extruder (ZSK 32) at processing temperatures usual for polycarbonate from 250 to 330° C.

A master batch with the following composition was compounded and then granulated:

70 wt.-% Makrolon™ 3108 polycarbonate 30 wt.-% titanium dioxide (Kronos™ 2230 supplied by the Kronos Titanium company) as white pigment filler.

Master Batch 3: Compounding of a Master Batch Containing a Laser-Sensitive Additive The production of the master batch was used for the production of the laserable layer(s), took place with a conventional twin-screw compounder extruder (ZSK 32) at processing temperatures usual for polycarbonate from 250 to 330° C.

A master batch with the following composition was compounded and then granulated:

99.994 wt.-% Makrolon™ 3108 polycarbonate 0.006 wt.-% (60 ppm). Lamp black 101 (carbon black supplied by the Degussa company) with average particle size of 95 nm General Production Standard for Extrusion and Co-Extrusion Films The plant used consists of an extruder with a screw of 105 mm in diameter (D) and a length of 41×D. The screw has a degassing zone;

a coextruder for applying the surface layer with a screw of the length 25 D and a diameter of 35 mm a reversing head;

a special coextrusion nozzle 1500 mm in width;

a triple roller polishing calendar with horizontal roller arrangement, whereby the third roller is tiltable by +/−45° relative to the horizontal;

a roller race;

a machine for reciprocal application of protective plastic film;

a take-off machine;

a spooling station.

Granulates of the base material were fed to the main extrusion hopper. Melting and conveying of the respective material took place in the respective cylinder/screw plastifier system. Both material melts came together in the coextrusion nozzle. The melt arrived at the polishing calendar from the nozzle. Final shaping and cooling of the material took place on the polishing calendar. Two polished chrome rollers (1st and 1st surface) were used for structuring the film surfaces. Subsequently the film was transported by a take off machine, the protective plastic film applied on both sides, and afterwards the film was spooled.

The compositions of the example films are described in tables 1 and 2.

TABLE 1 composition of the single layer extrusion films (examples 1 to 4)

| | Recipe | Melt temperature |
|---|---|---|
| Example 1 | M.3108 65% | 260° C. |
| 50 µm mono film, | DN 010 25% | |
| transparent, not | PBT 1600 10% | |
| laserable | | |
| Example 2 | M.3108 47% | 260° C. |
| 50 µm mono film, | Master batch 3 18% | |
| transparent, | DN 010 25% | |
| laserable | PBT 1600 10% | |
| Example 3 | M.3108 54% | 260° C. |
| 100 µm mono | Master batch 3 11% | |
| film, transparent, | DN 010 25% | |
| laserable | PBT 1600 10% | |
| Example 4 | M.3108 15% | 260° C. |
| 100 and 200 µm | Master batch 2 50% | |
| mono film, white | DN 010 25% | |
| opaque, not | PBT 1600 10% | |
| laserable | | |

TABLE 2 composition of the triple layer co-extrusion films (examples 5 to 8)

| | Layer (ii) | Thickness [μm] | Layer (i) | Thickness [μm] | Layer (iii) | Thickness [μm] |
|---|---|---|---|---|---|---|
| Example 5 (comparison) | 100 wt. % GN 001 | 20 | 82 wt.-% M.3108 18 wt % master batch 3 11 ppm laser-sensitive additive | 60 | 100% wt-% GN 001 | 20 |
| Example 6 (comparison) | 100 wt. % GN 001 | 10 | 90 wt.-% M.3108 10 wt.-% master batch 1 100 ppm laser-sensitive additive | 30 | 100 wt.-% GN 001 | 10 |
| Example 7 (comparison) | 100 wt. % GN 001 | 10 | 95 wt.-% M.3108 5 wt.-% master batch 1 50 ppm laser-sensitive additive | 30 | 100 wt.-% Eastar GN 001 | 10 |
| Example 8 | 100 wt. % GN 001 | 10 | 55 wt.-% M.3108 25 wt.-% DN 010 10 wt.-% PBT 1600 10 % master batch 1 100 ppm laser-sensitive additive | 30 | 100 wt.-% GN 001 | 10 |

Production of Laser-Writable Identification Documents (ID Card)

Films used for the ID card layer structure (beside the films of examples 1 to 8):

Film 1-1: White Filled Film for the Core of the Card Structure

A polycarbonate film 300 μm thick of Makrolon™ 3108 polycarbonate and master batch 2 in the ratio 1:1 was made at a mass temperature of approx. 280° C. by means of extrusion.

Film 1-2: White Filled Film for the Core of the Card Structure

A film with the same composition as film 1-1 of thickness 350 μm was produced.

Film 2; Transparent Film as Non-Laserable Overlay Film

A polycarbonate film of thickness 50 μm was produced on the basis of Makrolon™ 3108 polycarbonate at a mass temperature of approx. 280° C. by means of extrusion.

The laser-writable ID-documents were laminated as follows in accordance with the layer structure of tables 3 and 4:

A symmetrical layer structure of the card was selected, in order to avoid bending of the card. In addition a pile in the sequence specified above was formed from the films and the lamination was carried out in each case on a laminating press of the Bürkle company with the following parameters. Card structures under the laminating conditions A and B were produced:

Conditions A
Preheating the press to 170-180° C.
Pressing for 8 minutes at a pressure of 15 N/cm²
Pressing for 2 minutes at a pressure of 200 N/cm²
Cooling of the press to 38° C. and opening of the press.
Conditions B
Preheating the press to 155° C.
Pressing for 8 minutes at a pressure of 15 N/cm²
Pressing for 2 minutes at a pressure of 200 N/cm²
Cooling of the press to 38° C. and opening of the press.

TABLE 3

Layer structure of the ID cards from films of examples 1 to 8:

| | ID-1 | ID-2 | ID-3 (comparison) | ID-4 (comparison) |
|---|---|---|---|---|
| Layer (1) | 50 μm film ex. 2 | 100 μm film ex. 3 | 100 μm PETG laserable | 100 μm PVC laserable |
| Layer (3) (core layer) | 700 μm film ex. 4 (2 × 350 μm ex. 4) | 600 μm film ex. 4 (2 × 300 μm ex. 4) | PETG white (2 × 300 μm) | PVC white 2 × 280 μm |
| Layer (1') | 50 μm film ex. 2 | 100 μm film ex. 3 | 100 μm PETG laserable) | 100 μm PVC laserable |

Ex.: Example

TABLE 4

Layer structure of the ID cards from films of examples 5 to 8:

| | ID-5 (comparison) | ID-6 (comparison) | ID-7 (comparison) | ID-8 |
|---|---|---|---|---|
| Layer (1) | 100 μm film ex. 5 | 50 μm film ex. 6 | 50 μm film ex. 7 | 50 μm film ex. 8 |
| Layer (3) core layer | 600 μm film 1-1 (2 × 300 μm) | 700 μm film 1-2 (2 × 350 μm) | 700 μm film 1-2 (2 × 350 μm) | 700 μm film 1-2 (2 × 350 μm) |
| Layer (1') | 100 μm film ex. 5 | 50 μm film ex. 6 | 50 μm film ex. 7 | 50 μm film ex. 8 |

Ex.: Example

Results of the Laminations

All cards could be laminated under the condition A in a bulge-free manner. The laminates could also already be laminated at 155° C. (condition B). A very good adhesion of the films of examples 1, 2 and 3 to the inlay film example 4, but in addition to the films 1-1 or 1-2 was obtained. The laminates of the comparison examples ID-3 and ID-4 were laminated with the same material in the core.

For examining the stability of the ID cards, card bending tests were carried out in accordance with ISO/IEC 7810 AMD 2 (2012) and ISO/IEC 10373-1 AMD 1 (2012) with the corresponding ID cards. The results are given in tables 5 and 6.

TABLE 5

Results of the card bending tests with artificial skin oil
(supplied by Wfk Testgewebe GmbH, Germany) and
acetone of examples ID-1 to ID-4

|  | ID-1 | ID-2 | ID-3 (comparison) | ID-4 (comparison) |
|---|---|---|---|---|
| Alternate bending cycles (skin oil) | 20000 | 25000 | 15000 | 11500 |
| Alternate bending cycles (acetone) | 17500 | 17500 | 14000 | <15000 |

TABLE 6

Results of the card bending tests with artificial skin oil
(supplied by Wfk Testgewebe GmbH, Germany)
and acetone of examples ID-5 to ID-8

|  | ID-5 (comparison) | ID-6 (comparison) | ID-7 (comparison) | ID-8 |
|---|---|---|---|---|
| Alternate bending cycles (skin oil) | 20000 | 17500 | 17500 | 17500 |
| Alternate bending cycles (acetone) | 25000 | 25000 | 25000 | 25000 |

Laser Engraving of the Laser-Writable Identification Documents ID-1 to ID-8

On the ID cards a laser engraving was carried out on a laser machine made by the Foba company with the following parameters:
  Laser medium: Nd:YAG
  Wave-length: 1064 nm
  Power: 40 Watt
  Current: 30 Amp
  Pulse frequency: 14 KHz
  Feed rate: 200 mm/sec During the laser engraving the information was only written on one of the laser-writable film layers of the ID card. As information a greyscale wedge was written by means of laser engraving into the laser-writable layer.

FIG. 1 shows the intensity of the black colouring dependent on the intensity of the laser power during the laser printing of the ID cards containing single-layer films (ID-1 to ID-4). The cards of the comparison versions ID-3 and ID-4 showed a non pure-white basic colouring and remained very pale with little colour intensity in its contrast when written by laser. In comparison to this cards ID-1 and ID-2 according to the invention were pure white, high-contrast and intensely black in their colouring when written by laser.

Figure 2:
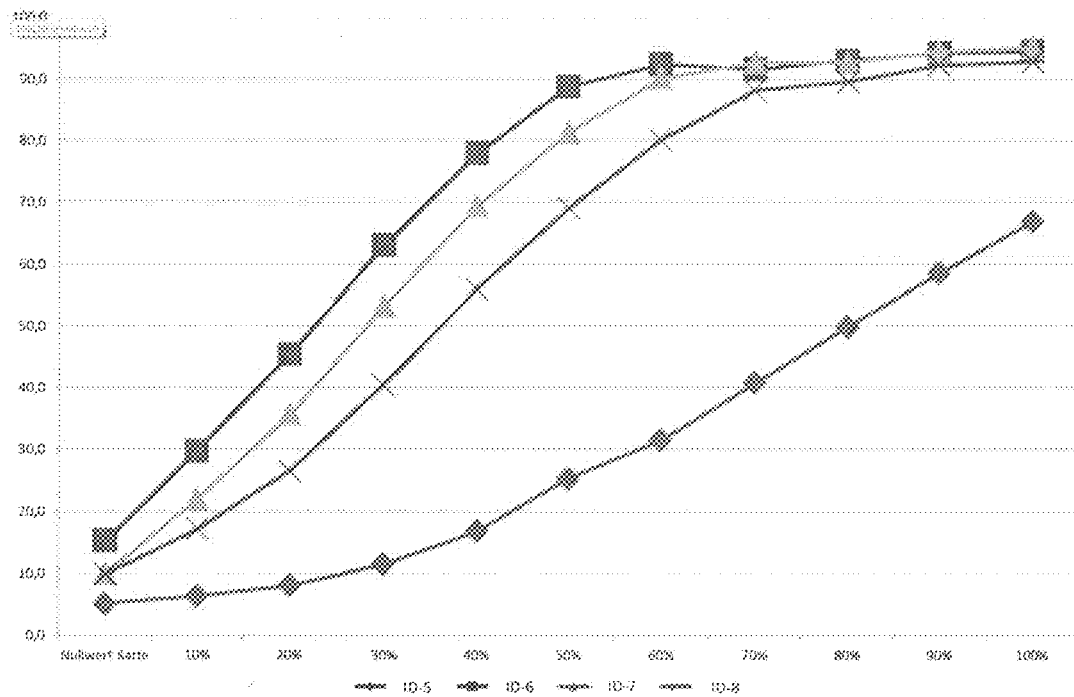

FIG. 2 shows the intensity of the black colouring dependent on the intensity of the laser power during the laser printing of the ID cards containing multi-layer films (ID-5 to ID-8). ID-5 on the one hand showed decreased laser engraving capacity and clearly worse contrasts than the card according to the invention ID-8. Although ID-6 (comparison) and ID-7 (comparison) showed good laser printing, the black colouring reached the saturation region too soon, so that differentiation is no longer possible in the laser-marked region. It is however particularly disadvantageous that the basic colouring of the card is too much (too grey). In FIG. 2 this effect is demonstrated by a high grey value as zero value.

The invention claimed is:

1. A film comprising at least one layer (i) containing at least one blend from at least one or several poly or co-polycondensate(s) of an aromatic and/or a cycloalkyl dicarbonic acid and aliphatic, cycloaliphatic and/or araliphatic dials with 2 to 16 carbon atoms with one or several poly or co-polycarbonates(s), and at least one laser-sensitive additive,
  wherein the portion of poly or co-polycarbonates(s) in the blend lies in a range from ≥50 wt.-% to ≤90 wt.-% and wherein the poly or co-polycondensate(s) of an aromatic and/or a cycloalkyl dicarbonic acid and aliphatic, cycloaliphatic and/or araliphatic dials with 2 to 16 carbon atoms have a portion of 1,4-cyclohexane dimethanol, 1,3-cyclohexane dimethanol and/or 2,2,4,4-tetramethyl-1,3-cyclobutanediol in a range from ≥20 to ≤80 mol % related to the diol components, wherein the laser-sensitive additive is a black pigment, in a quantity of from 40 to 180 ppm.

2. The film as claimed in claim 1, wherein the black pigment is carbon black.

3. The film as claimed in claim 1, wherein the aromatic and/or cycloalkyl dicarbonic acid comprises at least one compound selected from the group consisting of orthophthalic acid, teraphthalic acid, isophthalic acid, tert butylisophthalic acid, 3,3'-diphenyl dicarbonic acid, 4,4'-diphenyl dicarbonic acid, 4,4-benzophenone dicarbonic acid, 3,4'-benzophenone dicarbonic acid, 4,4'-diphenyl ether dicarbonic acid, 4,4'-diphenyl sulfone dicarbonic acid, 2,2-bis(4-carboxyphenyl)-propane, trimethyl-3-phenyl lindane-4,5'-dicarbonic acid, napthalene-1,4-dicarbonic acid, napthalene-1,5-dicarbonic acid, napthalene-2,6-dicarbonic acid, cyclohexane dicarbonic acid, and a reactive derivative of teraphthalic acid mentioned, napthalene-1,4-dicarbonic acid, napthalene-1,5-dicarbonic acid, napthalene-2,6-dicarbonic acid, isophthalic acid.

4. The film as claimed in claim 1, wherein the blend from at least one or several poly or co-polycondensate(s) of an aromatic and/or a cycloalkyl dicarbonic acid and aliphatic, cycloaliphatic and/or araliphatic dials with 2 to 16 carbon atoms with one or several poly or co-polycarbonates(s) comprises a blend from poly or co-polybutylene teraphthalate and/or glycol-modified poly or co-poly cyclohexylene dimethylene teraphthalate, provided that the portion of poly or co-polycarbonates(s) in this blend lies in a range from ≥50 wt.-% to ≤90 wt.-%, and wherein the poly or the co-polyterephthalate has a portion of 1,4-cyclohexane dimethanol, 1,3-cyclohexane dimethanol and/or tetramethyl-1,3-cyclobutanediol, in a range from ≥20 to ≤80 mol %, related to the dial components.

5. The film as claimed in claim 1, wherein the film comprises a further layer (ii) and this further layer contains one or several poly or co-polycondensate(s) of an aromatic and/or a cycloalkyl dicarbonic acid and aliphatic, cycloaliphatic and/or araliphatic dials with 2 to 16 carbon atoms.

6. The film as claimed in claim 5, wherein the film comprises a third layer (iii), this third layer comprising one or several poly or co-polycondensate(s) of an aromatic and/or a cycloalkyl dicarbonic acid and aliphatic, cycloaliphatic and/or araliphatic dials with 2 to 16 carbon atoms and the layers being arranged so that the two layers (ii) and (iii) form the outer layers of the film.

7. The film as claimed in claim 6, wherein the layer (ii) and/or the layer (iii) is free from poly and/or co-polycarbonate.

8. The film as claimed in claim 6, wherein the layer (ii) and/or the layer (iii) has a portion of 1,4-cyclohexane dimethanol, 1,3-cyclohexane dimethanol and/or 2,2,4,4-tetramethyl-1,3-butanediol, preferably 1,4-cyclohexane dimethanol and/or 1,3-cyclohexane dimethanol, in a range from ≥20 to ≤80 mol %, related to the dial components of one or several poly or co-polycondesate(s) of an aromatic and/or a cycloalkyl dicarbonic acid and aliphatic, cycloaliphatic and/or araliphatic dials with 2 to 16 carbon atoms.

9. The film as claimed in claim 1, wherein the film has a total coating thickness in the range of ≥30 to ≤145 μm.

10. The film as claimed in claim 6, wherein the outer layers ii) and iii) are the same in their composition.

11. The film as claimed in claim 5, wherein the film is produced by means of coextrusion.

12. A layer structure, comprising at least one film as claimed in claim 1.

13. A security document, containing at least one film as claimed in claim 1.

14. A method comprising utilizing the film as claimed in claim 1 as surface layer in a security document.

15. The film as claimed in claim 1, wherein the film has a surface resistance of from $10^7$ to $10^{13} \Omega$ determined in accordance with DIN IEC 60093 (1993).

* * * * *